United States Patent [19]
Wong

[11] 4,276,607
[45] Jun. 30, 1981

[54] MULTIPLIER CIRCUIT WHICH DETECTS AND SKIPS OVER TRAILING ZEROS

[75] Inventor: Wilson T. Wong, Anaheim, Calif.

[73] Assignee: Sperry Rand Corporation, New York, N.Y.

[21] Appl. No.: 28,214

[22] Filed: Apr. 9, 1979

[51] Int. Cl.³ .............................................. G06F 7/52
[52] U.S. Cl. .................................... 364/760; 364/757
[58] Field of Search ............... 364/760, 759, 758, 757, 364/748

[56] References Cited

U.S. PATENT DOCUMENTS

| | | | |
|---|---|---|---|
| 3,192,363 | 6/1965 | MacSorley | 364/760 |
| 4,130,879 | 12/1978 | Cushing | 364/748 |
| 4,173,789 | 11/1979 | Miura | 364/760 |

*Primary Examiner*—David H. Malzahn
*Attorney, Agent, or Firm*—G. Donald Weber, Jr.; Eugene T. Battjer; William E. Cleaver

[57] ABSTRACT

This invention is directed at an apparatus and method for detecting zero operand information and which also serves to detect trailing zeros. This circuit has application in computer circuitry, systems or the like wherein elongated information trains represented by multiple words of multiple bits are multiplied by equally long information trains. In many cases, the trains comprise a plurality of trailing zeros which, in accordance with the operation of this circuit, can be detected whereby the multiplication operation can be significantly speeded by avoiding unnecessary multiplication by zeros without loss of accuracy.

16 Claims, 6 Drawing Figures

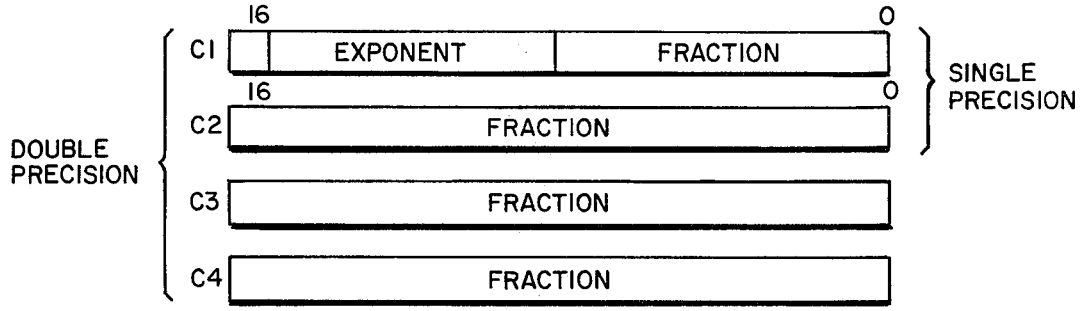
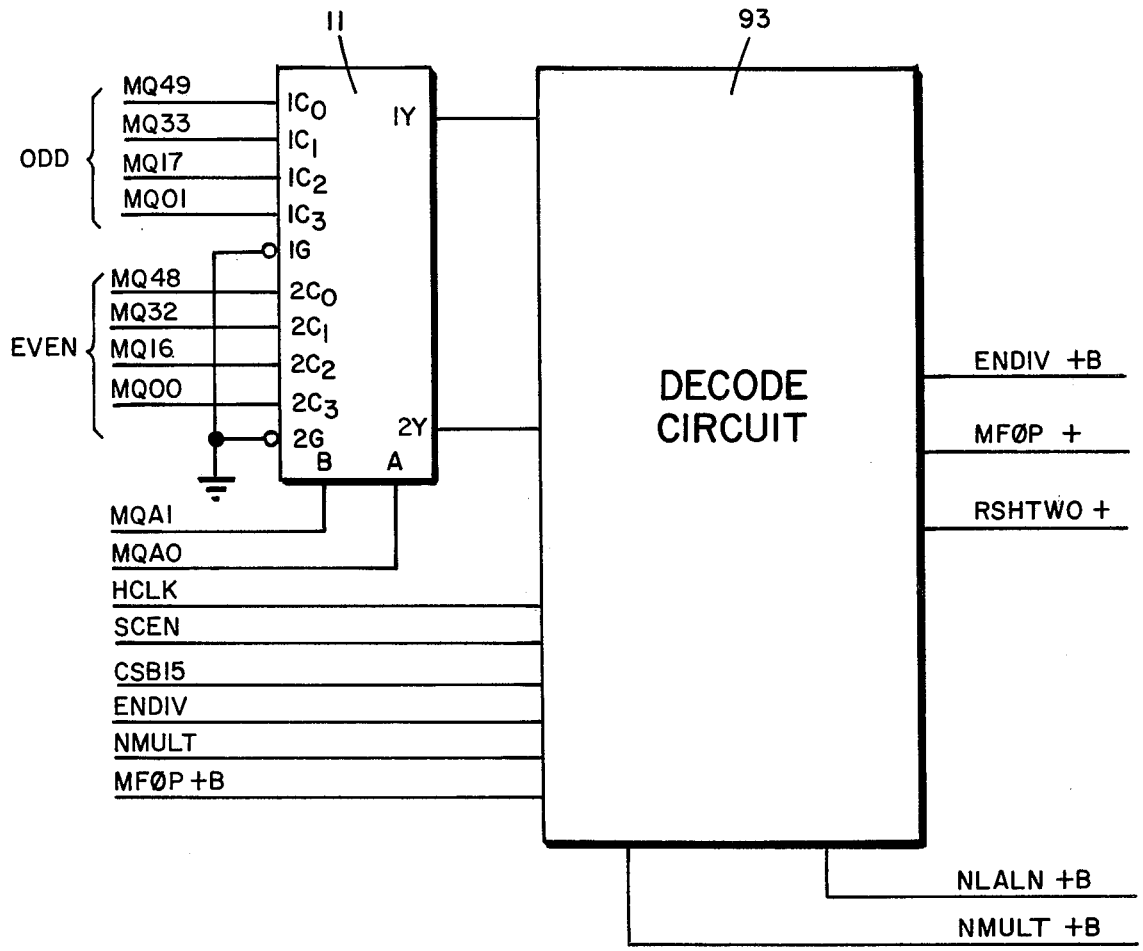

MULTIPLIER CIRCUIT WHICH DETECTS AND SKIPS OVER TRAILING ZEROS

BACKGROUND OF THE INVENTION

1. Field of the Invention

This invention is directed to computing apparatus circuitry, in general, and to a minicomputer circuit with relatively high speed multiplication in floating point numbers, in particular.

2. Prior Art

There are many known computing systems available in the art. Many of these computing systems utilize multiple bit information trains made up of multiple words to store or represent a number. In many cases, it is desirable (or necessary) to multiply two or more of these numbers. In many cases, the information trains representing the numbers may contain a number of trailing zeros. This is most common in floating point arithmetic when an integer is represented in the floating point number format. If a step-wise multiplication operation of known configuration is utilized, a long string of trailing zeros in the respective words will require an extended number of system operations wherein the multiplication operation is extremely slow and, consequently, limitative of the system operating speed. In the past, some techniques have been utilized to speed up this multiplication process; however, many of the known techniques require extensive adjustments in the computing system and wholesale revisions to the existing circuitry. That is, the speed of the multiplication operation is provided at the expense of an increase in the size of the circuit apparatus and complexity of the existing circuitry. However, all of the known techniques are either cumbersome, expensive or otherwise undesirable and inconvenient for use in existing computing circuitry.

PRIOR ART STATEMENT

To date, no search of the prior art has been conducted by applicant but applicant is aware of no circuitry which fulfills the purposes of this invention as readily and as easily as the circuitry described herein.

SUMMARY OF THE INSTANT INVENTION

In this invention, a number, which is represented by an elongated information train made up of multiple words, is provided to the circuit. Each word represents a portion of an input number to be operated upon. Each of the words is investigated by a detector as to non-zero content thereof. A register is enabled by the detector and stores a one if any word is detected to include non-zero portions. The register will also store a code which corresponds to the last non-zero word sent to the circuit. The code produced by the register controls a shift counter and a multiplexer circuit which automatically registers a circuit operation to essentially avoid trailing words which have only zero content and to maintain accuracy.

In operation, the words are applied in a sequence starting from the high order word to the low order word. The most significant bits (MSB) are first detected. A code (word number) is made to accompany each word. The code accompanying a non-zero word is stored. Consequently, the code (word number) stored in the register after all words are received always represents the lowest order, non-zero word. This word number is applied to the shift counter and the multiplexer. The multiplexer skips over the trailing zeros of the multiplier and, therefore, performs the multiplication operation only beginning with that word which is the lowest order word having a non-zero content. The shift counter which also receives the code (word number) reduces the number of iterative multiplication steps accordingly.

DESCRIPTION OF THE DRAWINGS

FIG. 1 is a schematic representation of an information train representing a floating point number used in the instant invention.

FIG. 2 is a schematic representation of the information train as shown in FIG. 1 rearranged to illustrate the words used in the instant invention.

FIG. 6 is a more detailed illustration of a portion of the circuit shown in FIG. 3, especially the multiplexer portion.

DESCRIPTION OF THE PREFERRED EMBODIMENT

Figure 4:
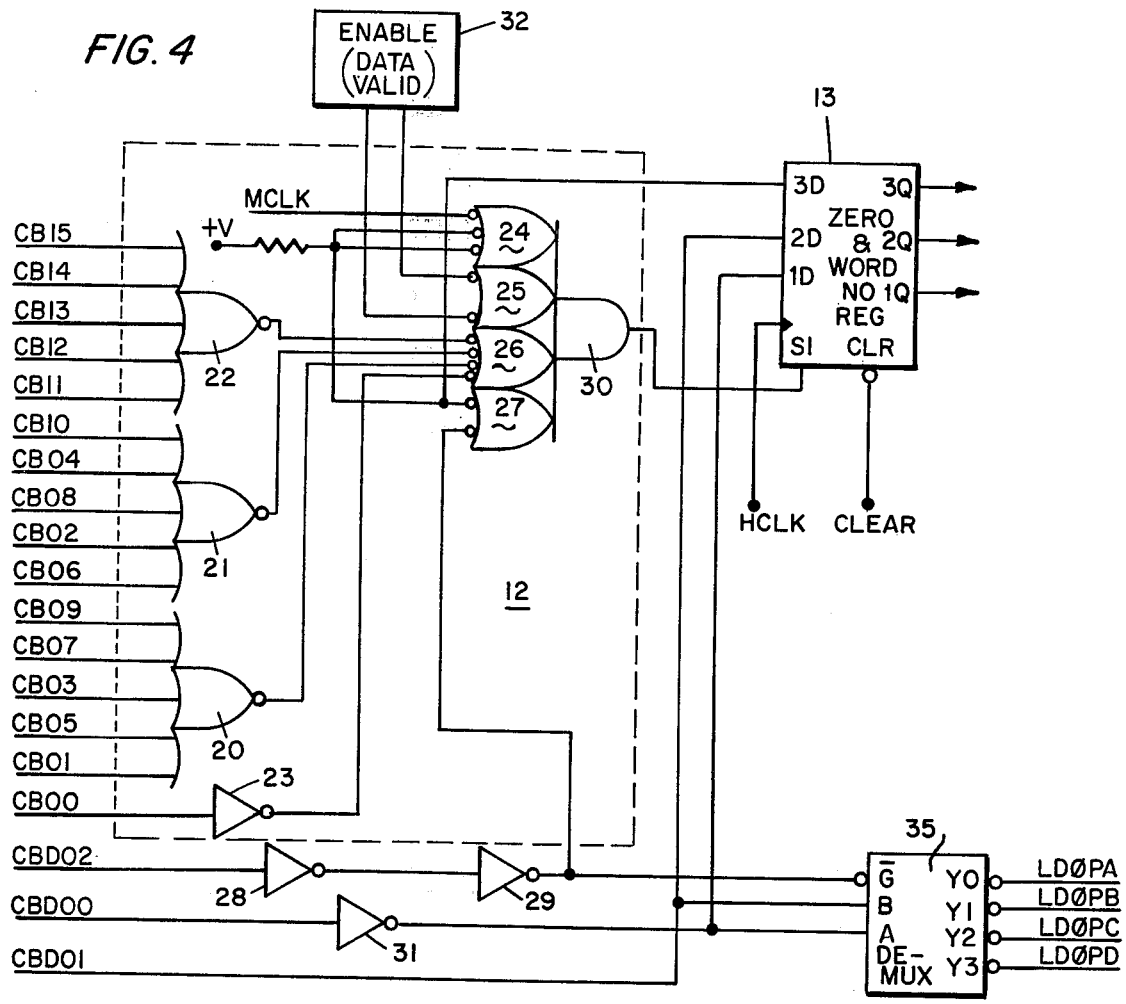
FIG. 4 is a more detailed representation of a portion of the circuit shown in FIG. 3, especially the detector and register portions.

Referring now to FIG. 1, there is shown a representation of an information train representing a floating point number used in a particular computer application. In this ilustration, the floating point number comprises 64 bits (0–63), with bit number 63 being the most significant bit (MSB) and bit number 0 being the least significant bit (LSB). In the format shown in this illustration, bit 63 is the sign bit which indicates the positive or negative value of the word. The next eight bits are designated the exponent which define the value of the exponential feature of the word. The subsequent bits, in this case bits 0 through 55, are designated the fraction portion of the word. The word can be expressed by the formula $W = F \times 2^E$ where W=word, F=fraction and E=exponent. The value of these expressions is determined by the content of the respective portions of the word. A zero is represented by having every bit in the whole information train set to zero.

It is well known in the art, that the fraction portion of the word may comprise a long string of zeros, especially at the trailing end thereof if the word represents an integer. If two words of similar length are multiplied by each other (i.e., multiplicand multiplied by multiplier), and the fraction portion of the multiplier comprises a plurality of trailing zeros, (e.g. sixteen or more zeros) a large number of multiplication steps would be utilized to multiply the respective zero portions. This operation would have the effect of seriously slowing the operation of the machine. Moreover, the operation has no purpose other than to maintain alignment of the multiplication iteration step.

In a minicomputer, the word length of the minicomputer is usually shorter than the elongated information trains which represent floating point numbers. Therefore, a floating point number is represented by concatenating several words together. This fact is made use of to speed up multiplication in the instant invention. In the particular illustration, the floating point number is 64 bits long. It is represented by concatenating four words, each 16 bits long.

As shown in FIG. 2, the words are labeled C1, C2, C3, and C4. Word C1 comprises 16 bits as do each of the other words. However, word C1 includes the sign bit, the exponent portion of the number and perhaps, a portion of the fraction part (depending upon the length of the respective words). The content of words C2, C3, and C4 represent other portions of the fraction part of the number involved. Clearly, if the exponent portion of the number has fewer or greater number of bits, the length of the fraction part in word C1 can vary. In a floating point multiplication, the exponent parts of the two operands are added, only the fraction parts are multiplied. However, the operation of the device remains the same although the format of the word structure may be different.

It should also be understood that in cases where less precision is required, it is possible that fewer words, such as only words C1 and C2 need be utilized, and, if more precision is preferred, then more words are utilized in the process. In point of fact, the description of the word formats shown in FIGS. 1 and 2 is illustrative only and is provided to assist in the understanding of the operation of the device.

Figure 3:
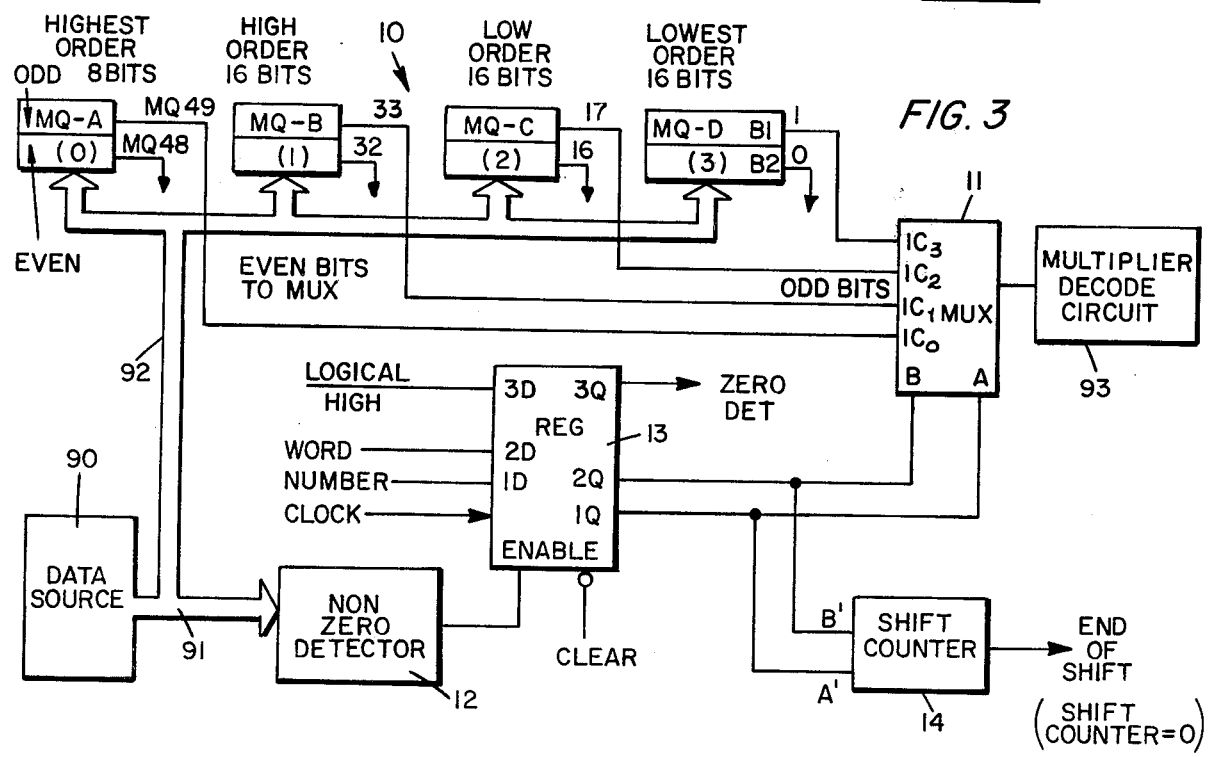
FIG. 3 is a schematic block diagram of the circuit which forms the instant invention.

Referring now to FIG. 3 there is shown a schematic block diagram of the circuit of the instant invention. The circuit includes an MQ register where the multiplier, that is, the fraction part of the second operand, is stored. The MQ register comprises a plurality of registers arranged in parallel. That is, each of the registers MQ-A, MQ-B, MQ-C and MQ-D comprise registers arranged with bits essentially in parallel. For example, bits B1 and B2 are consecutive bits in the word portion (see register MQ-D) but are arranged to be shifted out from the register at the same time, albeit on different lines (e.g., at terminals 1 and 0, respectively). Thus, the register has the effect of producing parallel output signals during any particular clock pulse time. The outputs of the respective register portions of the MQ register are connected to multiplex (MUX) circuit 11. In particular, the upper portion (odd bits) of each of the respective register portions is connected via terminals MQ49, 33, 17 and 1, respectively, to inputs 0,1,2 and 3 of MUX 11. Likewise, the lower portion (even bits) of each register portion is connected via terminals MQ48, 32, 16 and 0, respectively, to other terminals of MUX 11 although these connections are omitted from the drawing for simplicity. (For greater detail, reference is made to FIG. 6.)

The multiplier in the multiplication operation is stored in the MQ register as indicated. That is, bits B0, B1 ... B15 are stored in register portion MQ-D. Likewise, bits B16, B17 ... B31 are stored in register portion MQ-C. In like manner, register portions MQ-B and MQ-A store bits B32–B47 and B48–B55, respectively. With the parallel register arrangement as shown, the odd bits are stored in the upper part of the register portions and the even bits are stored in the lower part of the register portions. Of course, it is not required to use parallel register structures although this is a preferred embodiment which provides additional operating speed.

Non-Zero detector 12 includes a plurality (16) of input terminals which monitor the 16 bit words coming from a data source which also supplies the input signals to the respective portions of register 10. Therefore, the words are monitored at the same time they are transferred to the MQ register.

The output terminal of non-zero detector circuit 12 is connected to the enable input terminal of Zero-and-Word-Number register 13. In addition, register 13 receives a clear signal which is generated by other portions of the overall control circuitry to clear the contents of register 13 at the end of a floating point operation. A clock signal is also applied to register 13 from the overall control circuitry to synchronize the operation of register 13. The word number input signals are supplied to inputs 1D and 2D of register 13. The word number signals comprise a code which specifies the register portions of MQ register 10. The word numbers are 0, 1, 2 or 3 as indicated in the parenthetical nomenclature in the respective register portions. A steady state logical high input signal is applied to input terminal 3D of register 13 from the external control circuitry (not shown). The 3Q output signal from register 13 is generated in response to the logical high input signal at terminal 3D when register 13 is enabled by detector 12.

The output signals at terminals 1Q and 2Q are representative of the input signals on the word number lines. These output terminals are connected to the C and D input terminals of multiplexer circuit 11 and to the input terminals A' and B' of shift counter 13. In essence, the output signals at terminals 2Q and 1Q indicate which register portion of MQ register 10 is to be operated upon by multiplex circuit 11. Likewise, these word signals indicate the extent of the shifting process to be performed by MQ which is monitored by shift counter 14.

In operation, the appropriate word bits which comprise the second operand (i.e., multiplier) are supplied to MQ register 10 in 16 bit words in the order of C1, C2, C3, C4 as illustrated in FIGS. 1 and 2. The multiplicand is previously stored elsewhere in the system. That is, the word format is arranged to be supplied to register portions MQ-A, MQ-B, MQ-C and MQ-D. In the particular instance shown, register portion MQ-A stores the highest order bits except the sign and the exponent and register portion MQ-D stores the lowest order bits, with MQ-B and MQ-C storing the high and low intermediate order bits. In reference to FIG. 2, the fraction part of word C1 is stored in register portion MQ-A. Words C2, C3 and C4 are stored in register portions MQ-B, MQ-C and MQ-D, respectively.

Concurrently, the word are also supplied to the input terminals of non-zero detector 12 along path 91. Non-zero detector 12 operates so as to produce an output signal only in the presence of a non-zero bit being applied to an input terminal thereof. That is, if any one or more of the bits from a particular word is a binary 1, non-zero detector 12 produces a high level output signal which is supplied to the enable terminal of Zero-and-Word-Number register 13 and activates it. Otherwise, the register is not activated.

Concurrently, the word number signals are supplied to input terminals 1D and 2D of register 13 which has previously been cleared by the clear signal to indicate which word is applied to detector 12. This word number is representative of the word being transferred to a particular MQ register portion and being monitored by the non-zero detector 12. If a word is non-zero, the zero and word number register 13 is activated and the word number signals are transmitted through register 13 in response to the application of a clock signal. Thus, the signals at terminals 1D and 2D are transmitted to terminals 1Q and 2Q. In addition, the logical high input signal at terminal 3D is transmitted to terminal 3Q to indicate that a non-zero condition has been detected. After all four words have been transferred to MQ, all 64 bits of the floating-point number have been monitored by the non-zero detector 12, at certain points of time. If some of the words are non-zero, this condition will be registered by the zero and word number register 13. Moreover, the word number corresponding to the last non-zero word transferred to MQ is also registered in the zero and word number register 13. The word number signal is applied to multiplex circuit 11. These signals then indicate to multiplex circuit 11 which of the word portions from MQ register 10 have a non-zero content. In point of fact, the circuit operates to quickly detect the content of the overall word whereby the lowest order word which contains a non-zero content is determined. That is, word C1 from register portion MQ-A is observed first. Thereafter, the contents of register portions MQ-B, MQ-C and MQ-D are sequentially detected. The last which is known to have a non-zero content, therefore, controls the operation of multiplex circuit 11. For example, if the contents of MQ-D is found to be all zeros, while the contents of MQ-C are found to include a 1, the word number 2 is generated at output terminals 1Q and 2Q of register 13 and supplied to multiplex circuit 11.

Multiplex circuit 11 will select input two which is connected to the shift output of MQ-C, to thereby transmit the contents of portions of MQ-C, MQ-B and MQ-A (by shifting out from MQ-C) therethrough into the multiplier decoding circuit 93 for operation thereon. The contents of register portion MQ-D will not be transferred to the multiplier decode circuit inasmuch as it has been determined that these bits are all zeros.

However, in order to maintain the integrity of the operation, the word number signal is also supplied to shift counter 14. Shift counter 14 recognizes that the contents of one (or more) register portions have been effectively skipped and must be accounted for when shifting the content of MQ out for multiplier decoding. Thus, shift counter 14 causes fewer bits to be shifted out from MQ, therefore compensating for the zeros being skipped over. This also means that fewer multiplication iteration steps need to be performed. Thus, it can be seen that the multiplication operation can be effectively speeded by noting that the contents of the trailing words are all zeros and multiplication operations regarding these zeros can be eliminated. These zeros are, practically, ignored and no operation is performed for them.

Referring now to FIG. 4, there is shown in greater detail one circuit arrangement for use in the instant invention. One proposed configuration of non-zero detector 12 is shown enclosed within the dashed block outline. Detector 12 comprises, in this embodiment, three TTL integrated circuits of the NOR gate configuration. Each of these gates has multiple, in this case five, input terminals and a single output terminal. The input terminals of gates 20, 21, and 22 are connected to receive the word bits one through 15, inclusive, for each 16 bit word. Inverter 23 is connected to receive bit CB00. Thus, all sixteen bits from a word are supplied to the input terminals of logic circuits at the input of detector 12. The output terminals of gates 20 through 23 are connected to respective inverter inuts of NAND gates 26. In the particular instance shown, four gates are utilized to receive, in the proper logic arrangement, the input signals from the first logic level gating arrangement. For example, input terminals of gate 24 (2 terminals) and gate 27 (1 terminal) are connected to receive a signal which is clamped at the positive level (in this case $+V$). These signals are applied, of course, to obtain the logic input control properly. In addition, the clock signal MCLK is applied to one input of gate 24. This clock signal has the effect of synchronizing the output and operation of gates 24 through 27. That is, while clock MCLK is low, the output signal produced by gate 24 is maintained high. Likewise, gate 25 receives input signals from enable source 32 which essentially permits gates 24 to 27 to operate only after all input signals have settled. Thus, spurius signals are avoided. Also gate 27 receives the signal produced by inverter gates 28 and 29 which are connected in series to double invert a signal CBD02 from the controller of the CPU which also controls timing of gates 24–27.

The outputs of gates 24 through 27 are connected as inputs to AND gate 30. The output signal produced at the output terminal of gate 30 is connected to the enable terminal S1 of Zero-and-Word-Number register 13 as described supra. This signal has the effect of enabling register 13 when any one of the input signals CB00–CB16 is a binary 1. In the absence of a binary 1 at an input terminal of gates 20–22, register 13 is not enabled.

The word number inputs to register 13 are provided to terminals 2D and 1D, respectively. Terminal 2D receives the input signal CBD01 from the controlling CPU. Likewise, CBD00 is supplied from the CPU to the 1D terminal of register 13 via inverter circuit 31. In addition the signal CBD00, from inverter 31, and CBD01 are applied to the A and B input terminals, respectively, of demultiplexer 35. The CBD02 signal which has passed through the double inverters 28 and 29 is also supplied to the $\overline{G}$ input terminal of demultiplexer 35. The output signals from demultiplexer 35 are produced at terminals Y0, Y1, Y2, Y3. These output signals are used to control the loading of data bits into the respective portions of MQ register 10.

Demultiplexer 35 receives the word number signals CBD00, CBD01, and CBD02 from the CPU. These signals are provided by the CPU to identify the word being supplied to detector 12 and MQ register 10. Therefore, after decoding by demultiplexer 35, the output signals at terminals Y0 through Y3 selectively permit the loading of information into MQ register portions A, B, C and D, respectively. With the utilization of the input signals from the CPU to demultiplexer 35, the loading of the MQ register is controlled. In addition, word signals CBD00 and CBD01 are applied to register 13 to indicate the word number, i.e. word portion or chunk being loaded into the MQ register. This information is supplied to register 13 which produces output signals 2Q and 1Q as noted above to control shift counter 14 and multiplexer 11 as described hereinafter.

In addition, as is noted supra, input terminal 3D of register 13 receives the constant level input signal. This signal, in the embodiment described, comprises a high level signal. Hence, when decoder 12 detects any non-zero condition presented by the input word, register 13 is enabled by the output signal from AND gate 30. When register 13 is enabled, the high level signal at terminal 3D is transmitted therethrough to output terminal 3Q which indicates that a non-zero condition has been detected. In addition, the word signal status at terminals 2D and 1D is transmitted to output terminals 2Q and 1Q and provides information to shift counter 14 and multiplexer 11 as described.

The enable signals from enable source 32 are supplied by the remainder of the circuit such as the CPU or other timing control arrangement to provide synchronism with the remainder of the circuit and also to provide enabling signals which enable or permit operation of gates 24 through 27 at a prescribed time. This permits a settling of the operation of the circuit and assures that the data supplied to the inut terminals of gates 20 through 22 is settled and is valid. Of course, any suitable enabling structure can be utilized including any arrangement of logic gates or input conductors as may be desired.

Figure 5:
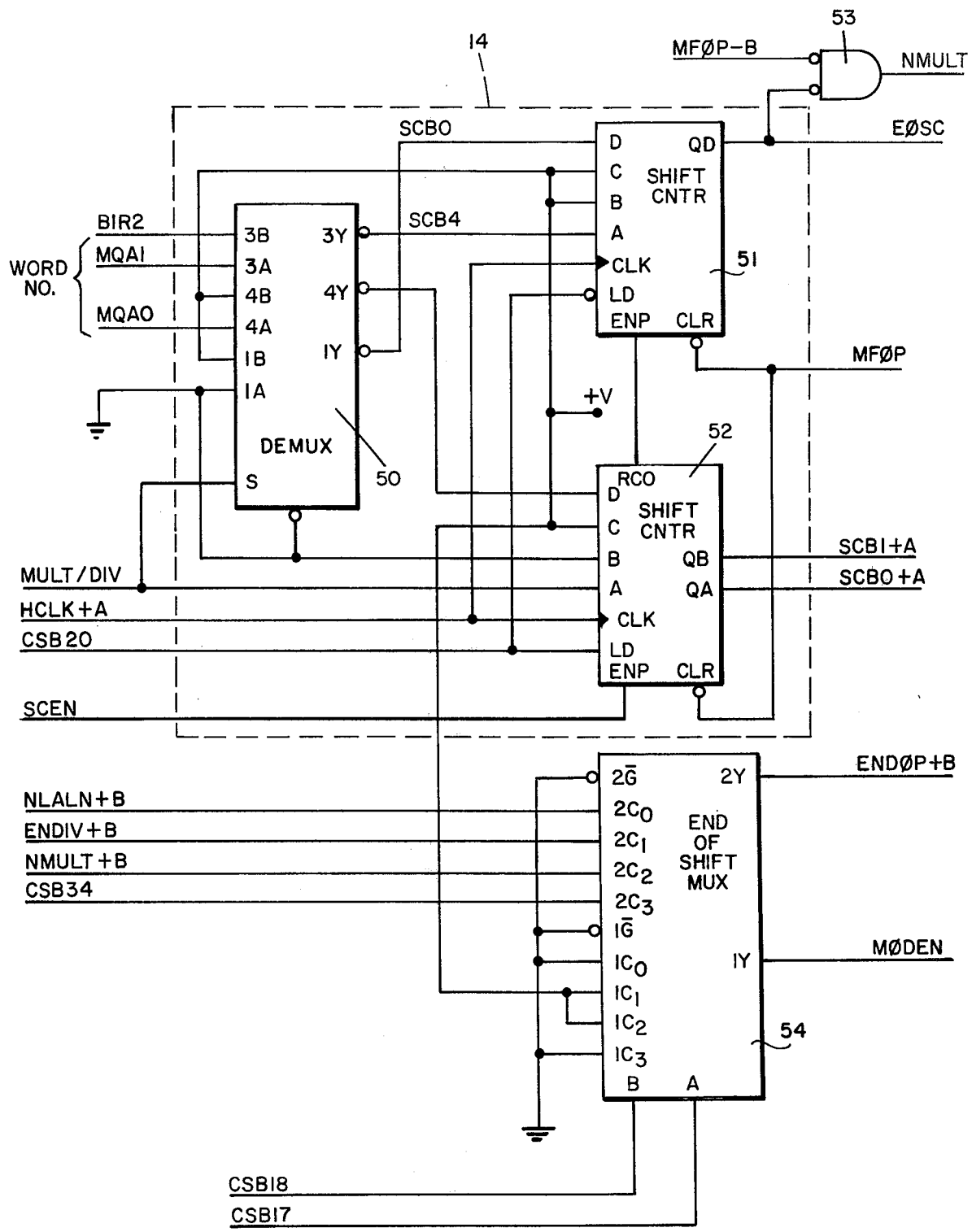
FIG. 5 is a more detailed representation of a portion of the circuit shown in FIG. 3, especially the shift counter portion.

Referring now to FIG. 5 there is shown a block diagram of one embodiment of shift counter 14. In this embodiment, shift counter 14 comprises demultiplexer 50 and registers 51 and 52. The word number signals MQA1 and MQA0 are supplied to terminals 3A and 4A of demultiplexer 50, respectively. Demultiplexer 50 operates on the word number signals to provide information to shift counter registers 51 and 52. The signals applied to registers 51 and 52 by demultiplexer 50 have the effect of altering the count status of counters 51 and 52. If 48 trailing zeros are skipped over, −4 will be applied to registers 51 and 52. If 32 trailing zeros, −12, if 16 trailing zeros, −20, if no trailing zero, −28. Thus, upon application of the load and the clock signal thereto, the shift counters 51 and 52 will store a negative number which represents a total count which is indicative of the shifts required by the MQ register after the trailing zeros are skipped over. During the multiplication interation, shift counters 51,52 are incremented as the multiplier bits are shifted out from the MQ register. When the shift counters 51,52 go to zero, counter 51 produces an output signal at terminal QD which is supplied to NOR gate 53.

This signal, in conjunction with control signal MFP which is supplied to the other terminal of NOR gate 53, produces the NMULT signal. Signal NMULT indicates that the end of the multiplication cycle has been reached. This signal is supplied to the end of shift multiplexer 54. Multiplexer 54 then produces an output signal to the control circuit and indicates the end of the multiply iteration. Shift counters 51,52 are also used to count the division iteration steps which is not pertinent to the inventive concept herein described. In addition, it should be noted that multiplexer 54 receives other input signals which are not pertinent to this discussion.

Referring now to FIG. 6, there is shown, a more detailed representation of multiplexer 11. Input terminals A and B are connected to receive the MQA1 and MQA0 word number signals which are produced by register 13 (see FIG. 4). In addition, multiplexer 11 receives input signals from the various MQ register portions. As is noted above, MQ register 10 comprises register portions arranged in parallel wherein two bits are produced at a time by the respective register portions. Thus, input signal terminals 2C0 through 2C3 receive even numbered bit signals (e.g. 0, 16, 32 and 48). Likewise, input terminals 1C0 through 1C3 receive odd numbered input bit signals (e.g. 1, 17, 33 and 49). These bit signals are provided at the MQ register portions as suggested in FIG. 3. The signals provided at the input terminals of multiplexer 11 are transferred therethrough to output terminals 1Y and 2Y in accordance with the status of the word number signals supplied to terminals A and B.

The output signals at terminals 1Y and 2Y are supplied to decode circuit 93 which operates upon the signals supplied thereto to decode these signals and, thus, determine what multiplication operation should be carried out. That is, the portions which are all zeros are not included in the multiplication operation wherein the trailing zeros are, effectively, skipped over and the time required for performing the multiplication operation is greatly reduced. Of course, the NMULT and the MFP signal are also supplied to decode circuit 93 along with clock signals and the like to control the operation thereof and to indicate, especially in the case of the NMULT signal (from NOR gate 53), the end of multiplication.

Thus, it is seen that there is provided a circuit means for substantially increasing the speed of multiplication of multi-bit words. The circuit makes use of the fact that in minicomputers floating point numbers, which consist of many bits, are made up of multiple words of shorter length. Therefore, the shorter words may be detected for zero or non-zero content sequentially. Moreover, if the words are applied to the circuit in sequence, the highest order bits are applied and detected first. The system keeps track of the words, and effectively operates on the lowest order word which displays a non-zero content. Any lower order words are, therefore, known to contain only zeros. These zeros are then skipped over during the multiplication process which uses only the lowest order word which has a non-zero configuration. In addition, a word number of identifier is used to control the number of shifts required to complete the multiplication process to compensate for the zeros skipped over.

The instant invention is shown and described in substantial detail in terms of logic circuits and components. It must be understood by those skilled in the art that modifications or rearrangements of the specific logic circuits and components can be accomplished. In addition, it may be possible to avoid the utilization of some of the specific components in the event that the multiplication word is made shorter or if the MQ register is not arranged in parallel as is described in the preferred embodiment. However, the detail shown is provided to establish one preferred embodiment of the invention which presents the best mode of implementation related to certain design requirements. Those skilled in the art may be able to provide alternative detailed circuit arrangements which fall within the purview of the invention as shown and described herein. Any such modifications are, of course, intended to be included herein as well. The scope of this invention is limited only by the claims appended hereto.

Having thus described a preferred embodiment of the invention, what is claimed is:

1. A multiplier circuit comprising,
    register means for storing the bits of a number to be multiplied,
    decoder means connected to receive bits from said register means to produce an output signal representative of said number to be multiplied,
    detector means for operating on said number to be multiplied to detect the presence of a non-zero bit in said number,
    control register means connected to said decoder means for indicating the presence of a non-zero bit in said number to be multiplied when said control register means is enabled by a signal from said detector means as the result of detecting a non-zero bit, and shift counter-means connected to said control register means for controlling the number of shifts to be performed during the multiplication process as a function of a signal from said control register means.

2. The multiplier circuit recited in claim 1 wherein, said register means comprises a plurality of register sections connected together such that portions of said number are respectively stored in said register sections.

3. The multiplier circuit recited in claim 2 wherein, said register sections are parallel connected so that two bits are produced substantially simultaneously by a section.

4. The multiplier circuit recited in claim 2 wherein, said detector means is connected to receive bits concurrently with one of said register sections thereby to identify a non-zero bit in terms of the portion of the number stored in a register section.

5. The multiplier circuit recited in claim 2 wherein said register means is connected to receive the least significant bits first, and said detector means operates on said least significant bits first.

6. The multiplier circuit recited in claim 1 including, work number means for identifying a portion of said number, said word number means connected to said control register means to identify the portion of the number which includes a non-zero bit.

7. The multiplier circuit recited in claim 6 including, second multiplexer means connected to said register means for controlling the application and storage of bits in said register means.

8. The multiplier circuit recited in claim 7 wherein, said second multiplexer means is connected to receive signals from said work number means.

9. The multiplier circuit recited in claim 1 wherein, said decoder means includes multiplexer means connected to receive bits from said register means and to produce an output signal representative of the received bits as a function of the signal supplied thereto by said control register.

10. The multiplier circuit recited in claim 9 wherein, said shift counter means and said multiplexer means connected to be controlled by the same signals from said control register means.

11. The multiplier circuit recited in claim 9 wherein, said multiplexer means is connected to receive at least one odd bit from said register means and to receive at least one even bit from said register means.

12. The multiplier circuit recited in claim 11 wherein, said odd bit and said even bit are produced by said register means at substantially the same time.

13. The multiplier circuit recited in claim 1 including, an end of shift multiplexer connected to said shift counter means for indicating that the appropriate number of bit shifts have occurred so that all previously skipped trailing zeros are accounted for.

14. The multiplier circuit recited in claim 1 wherein said control register means produces an output signal representative of the lowest order portion of the number to be multiplied which contains a non-zero bit.

15. The multiplier circuit recited in claim 1 including, data source means connected to said detector means and said register means such that the bits of said number are applied thereto substantially concurrently.

16. The multiplier circuit recited in claim 1 wherein, said detector means includes a first plurality of logic gate devices for receiving and operating upon the individual bits of said number to be multiplied, and a second plurality of logic gate devices for receiving and operating upon the signal produced by said first plurality of logic gate devices in conjunction with specified control signals in order to produce an output signal from said detector means representative of a non-zero condition in said work to be multiplied.

* * * * *